(12) United States Patent
Barthel et al.

(10) Patent No.: US 11,674,626 B2
(45) Date of Patent: Jun. 13, 2023

(54) QUICK CONNECTOR WITH AN INDICATOR

(71) Applicant: TI Automotive (Fuldabrück) GmbH, Fuldabrück (DE)

(72) Inventors: Iris Barthel, Schauenburg (DE); Kay Bube, Schenklengsfeld (DE); Reiner Rohde, Malsfeld (DE); Andreas Szczepaniak, Lohfelden (DE)

(73) Assignee: TI AUTOMOTIVE (FULDABRUECK) GMBH, Fuldabrueck (DE)

( * ) Notice: Subject to any disclaimer, the term of this patent is extended or adjusted under 35 U.S.C. 154(b) by 70 days.

(21) Appl. No.: 17/198,503

(22) Filed: Mar. 11, 2021

(65) Prior Publication Data
US 2021/0301960 A1 Sep. 30, 2021

(30) Foreign Application Priority Data
Mar. 12, 2020 (EP) ................................. 20162801

(51) Int. Cl.
*F16L 37/098* (2006.01)

(52) U.S. Cl.
CPC ....... *F16L 37/0985* (2013.01); *F16L 2201/10* (2013.01)

(58) Field of Classification Search
CPC . F16L 37/0885; F16L 37/098; F16L 37/0985; F16L 37/142; F16L 37/148
USPC ........................................................ 285/93
See application file for complete search history.

(56) References Cited

U.S. PATENT DOCUMENTS

| 2007/0126232 | A1 | 6/2007 | Campagna et al. |
| 2010/0127492 | A1* | 5/2010 | Poder ................. F16L 37/0841 285/93 |
| 2017/0067588 | A1 | 3/2017 | Chaupin et al. |

FOREIGN PATENT DOCUMENTS

| CN | 101644368 | 2/2010 |
| CN | 101876387 | 11/2010 |
| CN | 105090641 | 11/2015 |
| CN | 108139006 | 6/2018 |
| CN | 109737260 | 5/2019 |
| EP | 1554516 A1 | 7/2005 |
| EP | 1770321 A1 | 4/2007 |

(Continued)

OTHER PUBLICATIONS

FR 2891344 Translation (Year: 2007).*

*Primary Examiner* — Aaron M Dunwoody
(74) *Attorney, Agent, or Firm* — Dickinson Wright PLLC

(57) ABSTRACT

Quick connector having a coupling body and a multifunctional part with a retention unit and an indicator. The coupling body includes a head portion at one end and a plug-in portion at the other end, the plug-in portion configured for attaching to a first tube, the head portion having an axial opening for introduction of a counterpart with a circumferential collar. The head portion has at least one radial opening for inserting the multifunctional part, the multifunctional part having a back for manual operation for the purpose of being inserted into the coupling body. The retention unit has two retention legs, and the indicator has two indicator limbs movable independently of the retention legs when inserting the circumferential collar. The indicator limbs and the coupling body are configured so that the indicator can be transferred from a partially inserted preassembly position to a fully inserted assembly position via movement of the indicator limbs.

20 Claims, 9 Drawing Sheets

(56) References Cited

FOREIGN PATENT DOCUMENTS

| | | |
|---|---|---|
| FR | 2891344 | 3/2007 |
| JP | 2006503246 | 1/2006 |
| JP | 2010270867 | 12/2010 |
| JP | 2017519170 | 7/2017 |
| WO | 2017219022 | 12/2017 |

* cited by examiner

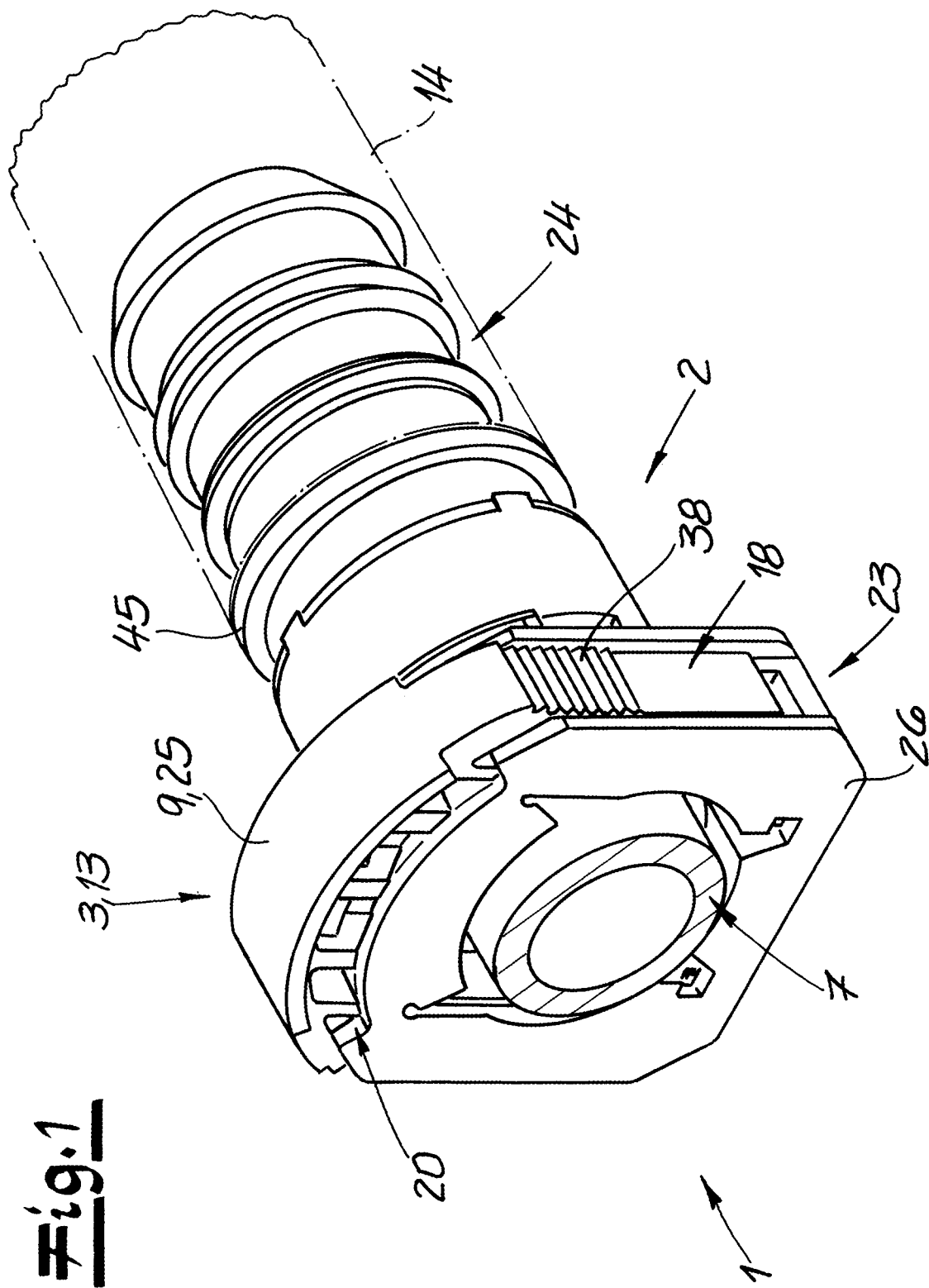

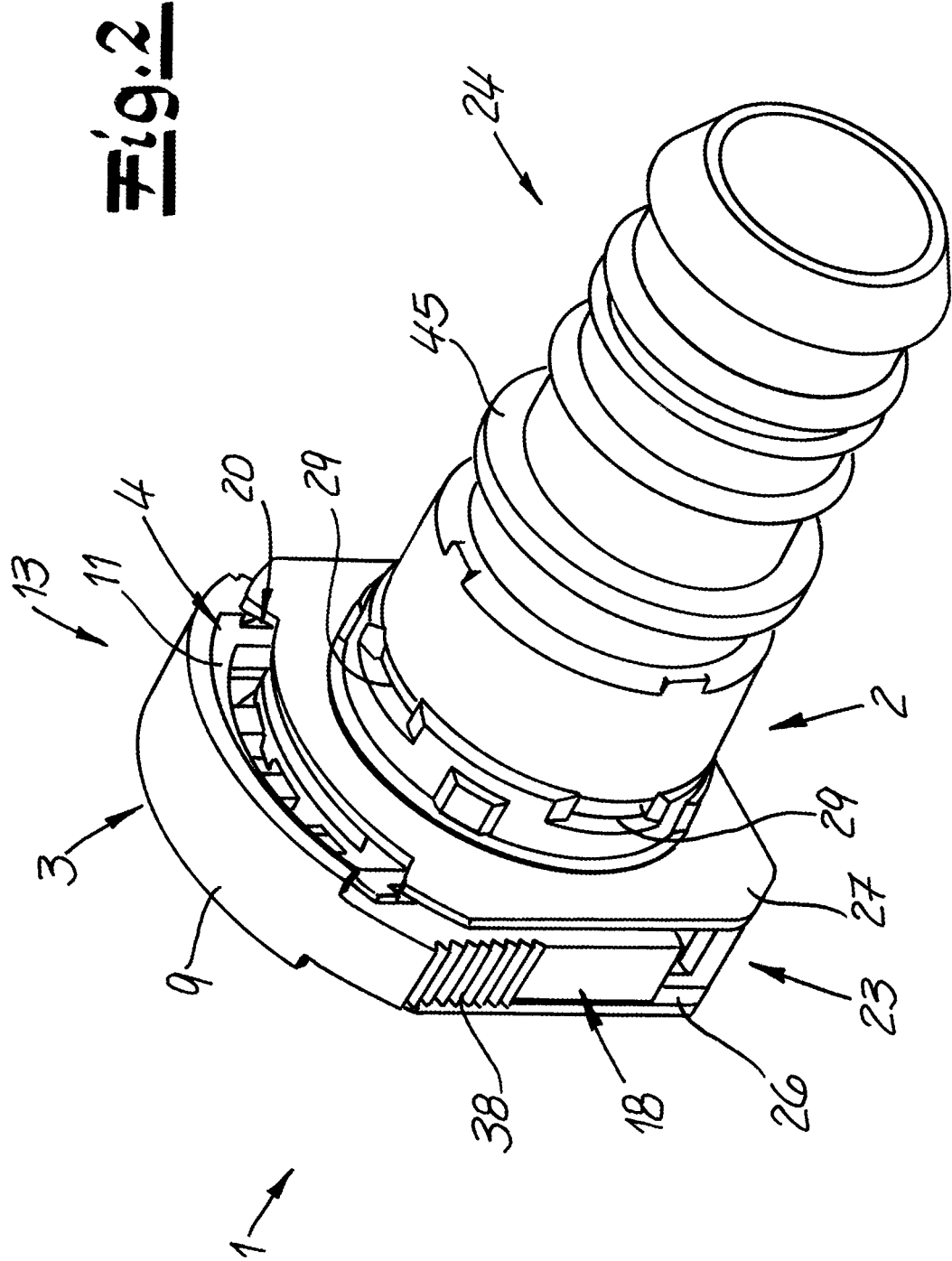

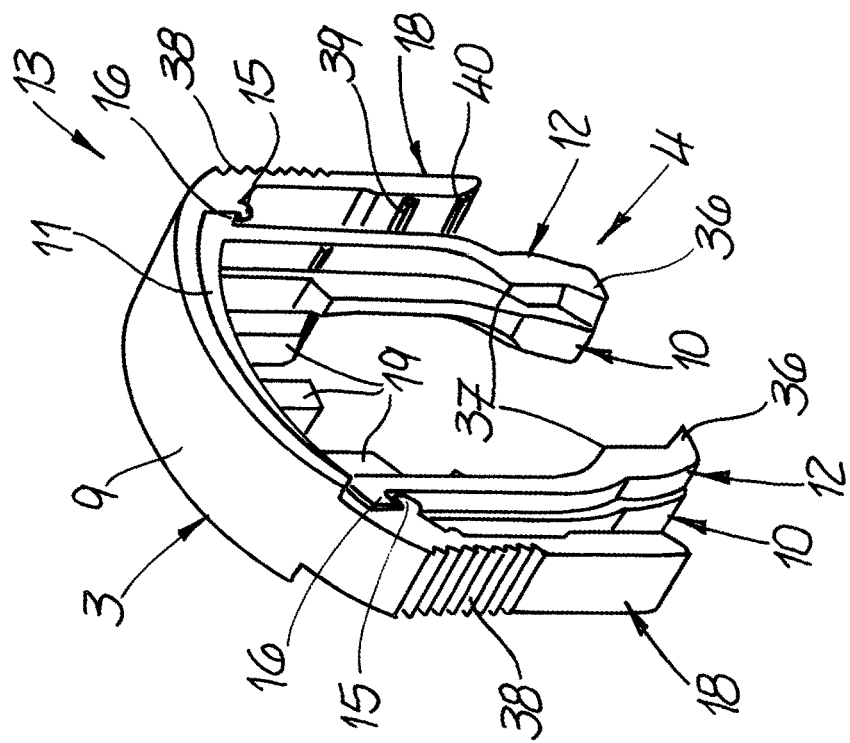
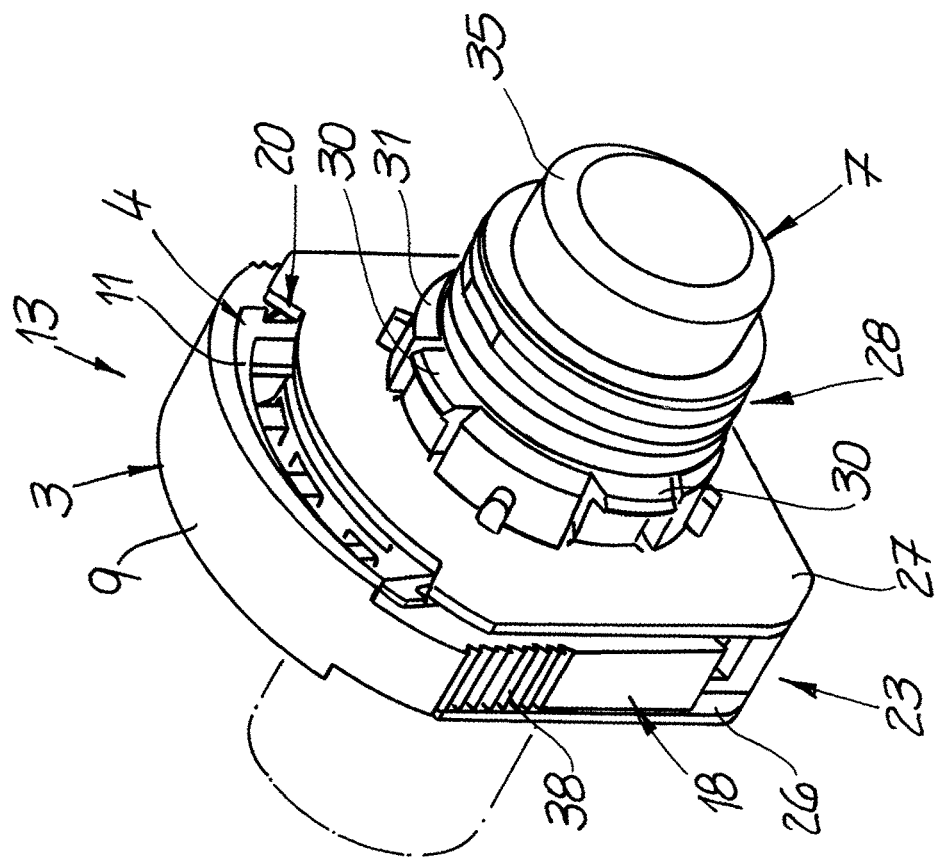

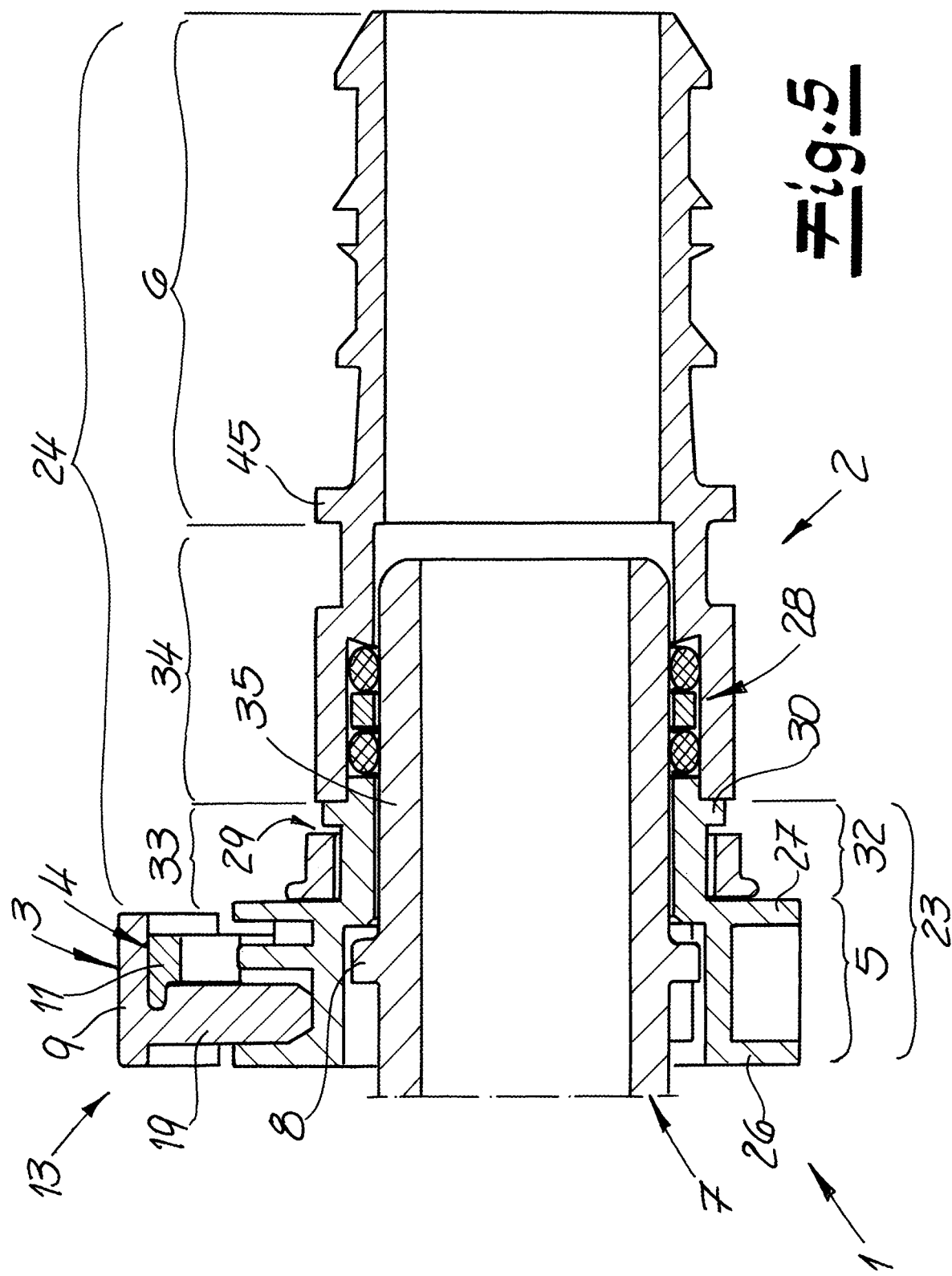

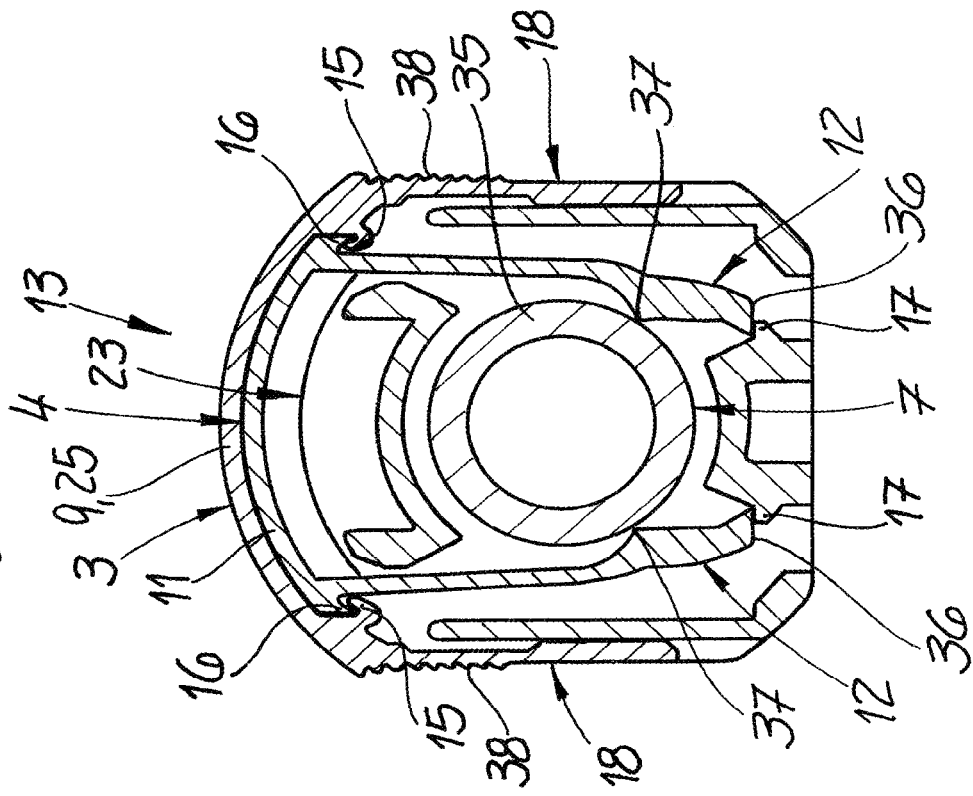
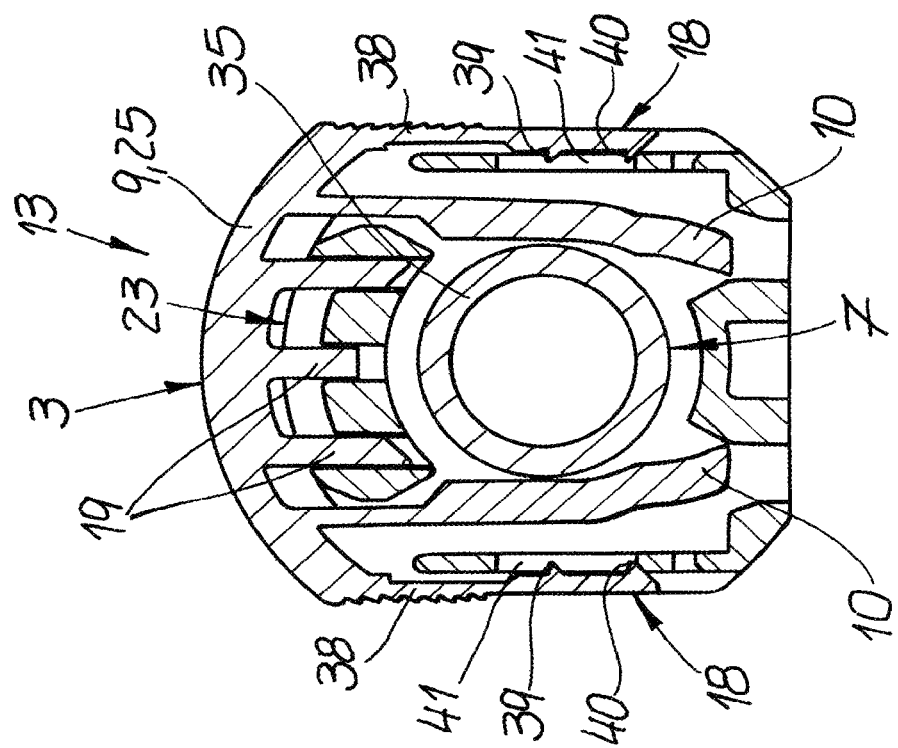

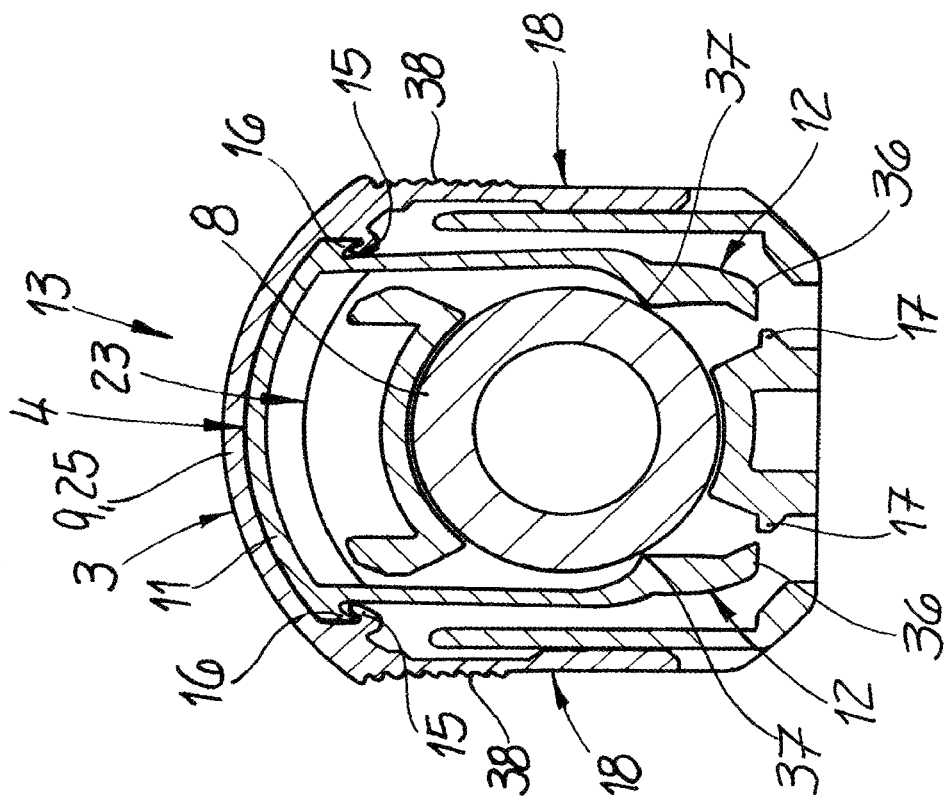
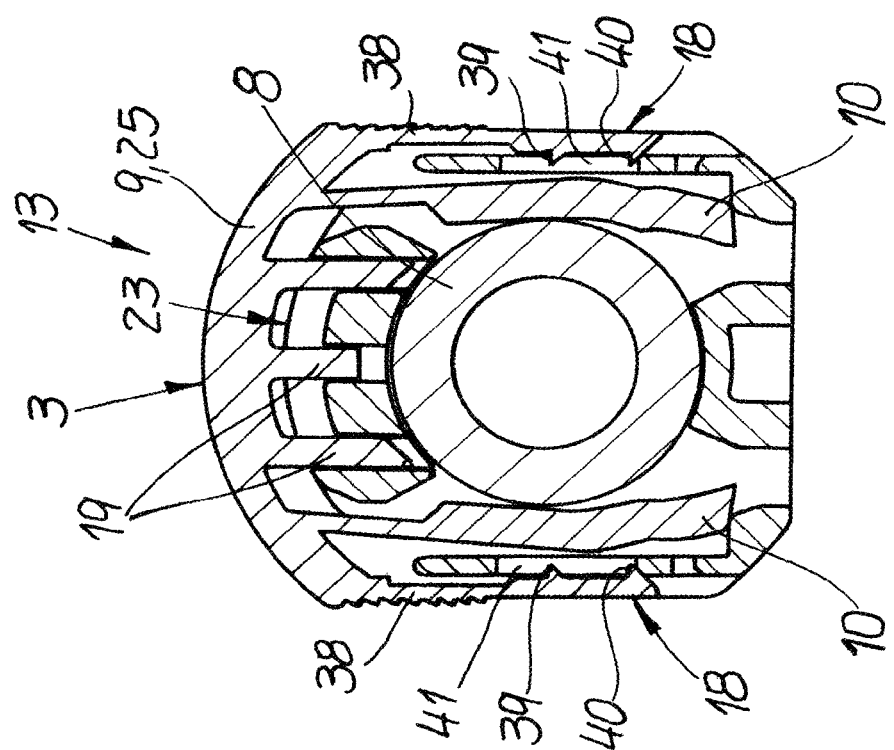

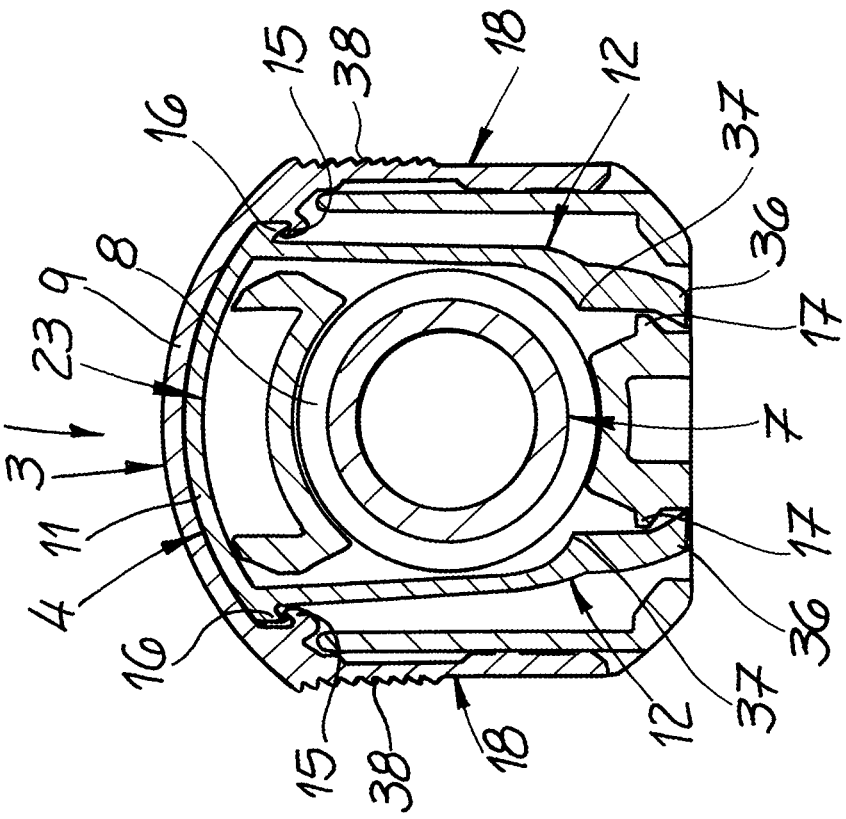
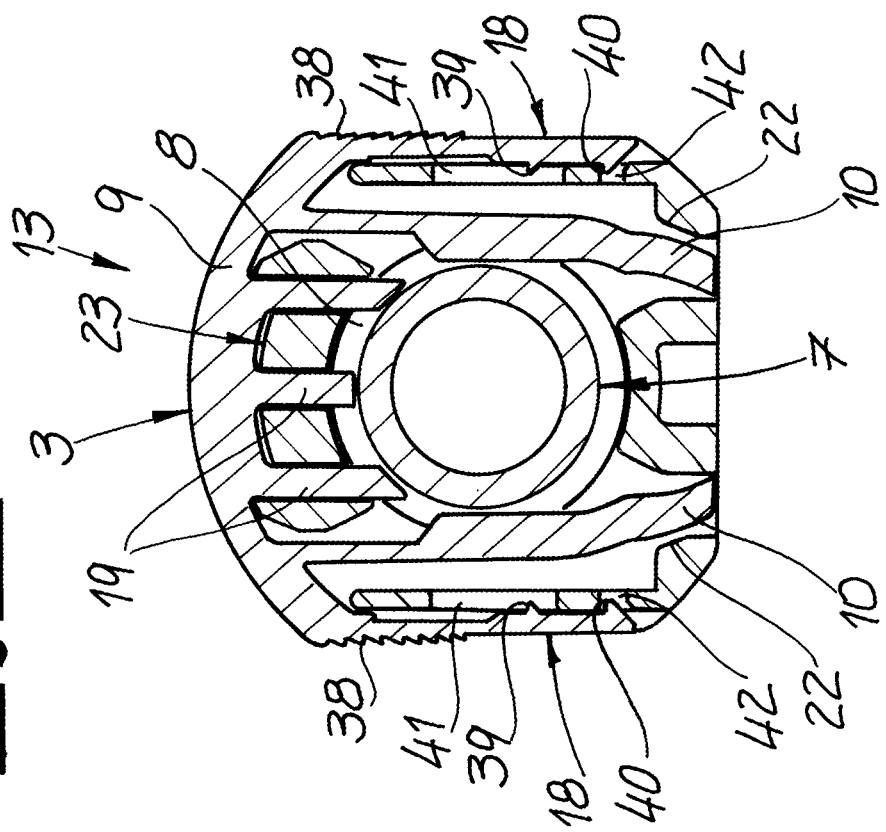

QUICK CONNECTOR WITH AN INDICATOR

RELATED APPLICATIONS

The present disclosure is a national phase application of European Application 20162801.3, filed on Mar. 12, 2020, the entire contents of each of which are incorporated herein by reference.

FIELD

The disclosure relates to a quick connector, comprising a coupling body and a multifunctional part, the multifunctional part having a retention unit and an indicator, the coupling body comprising a head portion at one end and a plug-in portion at the other end, the plug-in portion being formed for attaching or plugging in a first tube, the first tube being preferably held in a force fit and/or form fit and/or material connection on the plug-in portion, the head portion having an axial opening for the introduction of a counterpart having a circumferential collar, the head portion comprising at least one radial opening for inserting the multifunctional part, the multifunctional part having a back for manual operation for the purpose of being inserted into the coupling body, the retention unit comprising two retention legs, the indicator having two indicator limbs, the indicator limbs being movable independently of the retention legs when inserting the circumferential collar, the indicator limbs and the coupling body being formed so that the indicator can be transferred from a partially inserted preassembly position to a fully inserted assembly position due to the movement of the indicator limbs caused by the circumferential collar.

BACKGROUND

A quick connector of this type is disclosed, for example, in EP 2 988 048 B1, which quick connector comprises a coupling body, a retention unit, and an indicator. In a first step, the retention unit with its two retention legs is inserted fully radially into the coupling body. In a second step, the indicator is only partially inserted radially into the coupling body so that it protrudes somewhat from the coupling body and thus assumes a preassembled position. The indicator cannot be inserted in any further because its indicator limbs are prevented from moving further inside the coupling body by means of stop elements of the coupling body. Then, in a third step, a counterpart in the form of a plug shaft having a circumferential collar is axially and fully inserted into the coupling body in order to latch there with the retention unit in a generally known manner for the purpose of fixing. Only now, in a fourth and last step, can the indicator be inserted fully radially because the indicator limbs have been spread apart by the circumferential collar so that the indicator limbs can slide past the stop elements.

The disadvantage of such quick connectors is that they have a plurality of moving parts with respect to the coupling body. If, for example, an associated fluid line is examined in the course of a repair or maintenance, it can easily happen that when the connection of the quick connector is released, both the indicator and the retention unit are removed from the coupling body or fall out. Experience has shown that, during this process, the retention unit or indicator is lost or damaged during the subsequent re-establishment of the connection. The damage often stems from the fact that, due to ignorance of the above sequence of steps and ignorance of the orientation of the parts to be moved, trial-and-error assemblies occur, in which too much force is often used and one part breaks. This is particularly important when the vehicle is older and the plastics material has become more brittle. The lack of knowledge is not surprising because there are now a large number of quick connector systems, all of which work differently and new quick connector systems come onto the market every year.

For this reason, it is proposed in DE 10 2016 111 471 A1, for example, to integrate the indicator function into the retention unit so that there is only a single multifunctional part which is produced by injection molding and which is thus integrally formed. This multifunctional part has two retention legs which are radially opposite one another and which are fastened to the back of the multifunctional part, extend in a direction of insertion and, together with the back, represent an approximately U-shaped component. Two indicator limbs, which are located radially opposite one another, also extend from the back, and also extend in a direction of insertion and, with the back, likewise represent an approximately U-shaped component. The indicator limbs are arranged axially behind the retention legs and can be spread apart independently of them. A circumferential collar of a male counterpart therefore initially spreads the retention legs apart when introduced into the coupling body, which shortly thereafter resume their original position and thus lock the circumferential collar in the coupling body. Only then are the indicator limbs spread apart and now allow the multifunctional part to be transferred from a partially to a fully inserted position.

The disadvantage of the quick connector with the multifunctional part is that the axial extension of the head portion of the coupling body is quite large. Because of the increasing tightness in engine compartments or in vehicles in general, those components which have not only a larger radial but also a larger axial extent are particularly problematic. More compact quick connectors—in particular with head portions of smaller axial extent—offer a greater variety of uses and are more convenient with regard to removal and reinstallation for maintenance/repairs. In addition, the multifunctional part is formed to be very complex, which is why the production of the injection molding tools for the multifunctional part is very cost-intensive.

BRIEF SUMMARY

The disclosure is therefore based on the object of specifying a more compact and preferably also more cost-effective quick connector having an indicator function. This object is or these objects are achieved by a quick connector according to the preamble of claim 1, preferably characterized in that the retention unit and the indicator are at least two separate parts, the indicator being fastened directly to the retention unit so that the indicator and the retention unit are also fastened to one another outside of the coupling body.

The expression "separate parts" preferably means at least two parts and particularly preferably only two parts, which are each produced separately by injection molding. The term "fastened" preferably means a form fit and/or a force fit and/or a material connection. The expression "immediately fastened" advantageously means that when removing or inserting the retention unit, the indicator is automatically moved along with it. Preferably, the coupling body and other elements do not play a role in fastening the indicator to the retention unit.

The disclosure is initially based on the knowledge that the use of a separate retention unit and a separate indicator significantly reduces the costs for the production of the injection molding tools, because they are less complex as a result. By decoupling the indicator and the retention unit during the injection molding production, less mutually limiting framework conditions have to be taken into account, which makes the multifunctional part even more valuable overall. Since in the case of integrally formed multifunctional parts, for reasons of injection molding technology, for example the gap between the retention legs and the indicator limbs cannot be made as small as desired, see DE 10 2016 111 471 A1. In the case of multifunctional parts according to the disclosure, on the other hand, only a minimal gap has to be left between the retention legs and the indicator limbs. Consequently, in the case of the multifunctional parts according to the disclosure, the axial extent of the head portion of the coupling body can be reduced, so that the head portion ensures a greater variety of uses of the quick connector and greater convenience with regard to dismantling and reassembly during maintenance/repairs. The above objects are thus achieved by using the quick connector according to the disclosure.

The aforementioned object of reduced axial expansion of the head portion is achieved by a quick connector according to the preamble of claim 2, preferably characterized in that the multifunctional part has two securing arms for securing the multifunctional part in the coupling body.

The disclosure relating to the securing arms on the multifunctional part is based on the knowledge that the multifunctional part—viewed in the axial direction—can be made even more compact than was previously known. This is because if the securing arms are preferably arranged radially around the retention unit or the indicator, there is no need to secure the multifunctional part by means of elements which expand in the axial direction. The securing arms themselves can be made relatively thin-walled in the radial direction, while the expansion of the head portion in the radial direction is already largely determined by the spreading of the retention unit or the indicator. In addition, the securing arms can take over the protective function of side walls of the head portion, so that correspondingly thick side walls of the head portion are no longer required and the provision of securing arms practically does not mean any additional, radial expansion of the head portion. The object relating to the reduced axial expansion of the head portion is thus achieved by using the quick connector according to the disclosure.

The head portion preferably comprises a front wall and a rear wall. It is preferred that the retention legs and/or the indicator limbs are arranged between the front wall and the rear wall. The rear wall advantageously faces the plug-in portion. It is advantageous that the front wall faces away from the rear wall or from the plug-in portion. The coupling body expediently comprises a sealing portion. The sealing portion is preferably arranged between the plug-in portion and the head portion. The coupling body expediently comprises a through channel for the fluidic connection of the male counterpart to the first tube.

The retention legs advantageously extend from the retention unit base or from the back of the multifunctional part in the direction of insertion. The retention legs are expediently mounted elastically in the radial direction on the retention unit base or on the back of the multifunctional part. It is preferred that the retention legs are formed so that they can be spread apart or are spread apart when the retention unit is located within the coupling body and when the circumferential collar of the counterpart touches the retention legs in the insertion direction of the counterpart. The retention unit or the multifunctional part is preferably substantially formed so as to be U-shaped. According to one embodiment, the retention unit or the multifunctional part is formed in the form of a ring and may, for example, assume an oval shape or some other shape, however circumferential.

It is within the scope of the disclosure that the indicator limbs extend from the indicator head or from the back of the multifunctional part in the direction of insertion. The indicator limbs are expediently mounted elastically on the indicator head or on the back of the multifunctional part. The indicator limbs are advantageously formed in such a way that they are movable or are moved when the indicator is located within the coupling body and the circumferential collar of the counterpart touches the indicator limbs in the insertion direction of the counterpart. The indicator is advantageously formed to be substantially U-shaped. According to one embodiment, the indicator is formed in the shape of a ring and may, for example, be oval or assume some other circumferential shape.

It is particularly preferred that the securing arms are movable independently of the retention legs and/or the indicator limbs. The expression "independently movable" preferably means that touching the counterpart with the retention unit or the indicator does not result in the other two pairs being moved in such a way that a different state is reached. Another state is reached, for example, when the indicator limbs are moved so far that they no longer hit the indicator stops in the preassembly position. It is particularly preferred that the securing arms are formed integrally with the retention unit and/or with the indicator. According to a special embodiment, the indicator and the retention unit are integrally formed or form a single, homogeneous injection-molded part. It is particularly preferred that the retention legs and/or the indicator limbs are arranged at least partially and preferably fully between the securing arms in the radial direction. It is particularly preferred that a radial distance between the securing arms is provided, or it is particularly preferred that the retention legs and/or the indicator limbs are arranged at least partially and preferably fully between the securing arms in the radial direction. It is particularly preferred that a radial distance between the securing arms overlap. The securing arms each advantageously comprise at least one latching element. According to a preferred embodiment, the securing arms each have at least two latching elements. It is preferred that the at least one latching element of the respective securing arm, together with a complementary latching element of the coupling body or the head portion, ensures that the multifunctional part is secured on the coupling body in the preassembly position and/or in the assembly position. It is particularly preferred that the at least one latching element is arranged on the securing arm on a radial inside of the respective securing arm. An element for increasing the grip is expediently arranged on an outside of the respective securing arm. The element for increasing the grip may be, for example, a roughened surface or a protruding element or a plurality of protruding elements.

It is very advantageous that the retention unit has a retention unit base and/or the indicator comprises an indicator head. It is particularly preferred that the retention legs and the retention unit base are integrally formed. The back of the multifunctional part and the retention unit base are preferably integrally formed or identical to one another. The indicator head is advantageously formed integrally with the indicator limbs. According to one embodiment, the indicator head is formed integrally with the back of the multifunctional part or is identical thereto. According to a special embodiment, the indicator head is formed integrally with the retention unit base or is identical thereto.

It is within the scope of the disclosure that the indicator is fastened to the retention unit in a force fit and/or form fit and/or material connection and is preferably clamped. The indicator is preferably fastened to the retention unit by means of a force fit connection and more preferably by means of a form fit connection. It is preferred that the indicator enters into a force fit connection with the retention unit by means of movement in the axial direction.

It is possible for the indicator and the retention unit to be fastened to one another by means of a material connection. The term "material connection" preferably means gluing and/or welding. In contrast, the term "material connection" preferably does not mean that the retention unit and the indicator are integrally connected to one another, as is the case, for example, with a common injection molding. The retention unit preferably encloses the indicator at least partially in the circumferential direction. The retention unit base preferably overlaps at least partially and preferably fully with the indicator head in the axial direction. It is preferred that the retention unit base at least partially and preferably fully cover the indicator head in the assembly position and in a plan view.

According to a preferred embodiment, the retention unit and the indicator are latched or can be latched to one another. It is advantageous that a detachment of the indicator from the retention unit is prevented in a purely axial direction, which is preferably made possible by a latching connection on the retention unit and/or on the indicator and/or by a material connection between the retention unit and the indicator. The latching connection may be arranged, for example, in the region of the retention unit base or in the region of the indicator head or in the middle portions thereof. It is possible for there to be two latching connections, which can be located, for example, in the outer regions of the retention unit base or the indicator head. The material connection between the retention unit and the indicator is expediently located in the region of the retention unit base or the indicator head or in the region of their central portions. It is possible for the material connection to be located in two outer regions of the retention unit base or the indicator head and, for example, to include two connection points. The material connection can be produced, for example, by welding or gluing. The expression "preventing the indicator from becoming detached from the retention unit in a purely axial direction" preferably means that the indicator and retention unit can only be released while accepting destruction or damage to at least one of these two parts.

It is possible that the retention unit comprises a plastics material A and/or the indicator comprises a plastics material B, the plastics material A preferably differing from the plastics material B. The term "plastics material" can be a single, pure polymer, or a blend of a plurality of polymers. The term "plastics material" can in particular also contain additives (for example for colors, plasticizers, flame retardants, tribological properties) that are not polymers. The word "differ" also means, in particular, slight differences, so that the plastics material A differs from the plastics material B when these differ only with regard to the proportion of a single additive or the molar mass of the polymer in each case. It is very particularly preferred that there is a difference when the indicator and the retention unit come from different batches in a howsoever measurable manner. In particular, there is no difference except for when the retention unit and the indicator represent an integral injection-molded part. The expression "integral injection-molded part" preferably means those multifunctional parts in which, after the injection molding has cooled down, a retention unit and an indicator are present at the same time and these are connected to one another at the same time. According to one embodiment, the retention unit and/or the indicator comprises a metal.

According to a particularly preferred embodiment, the retention unit has at least one projection and preferably at least two projections which protrude or project radially inward, so that the indicator is preferably prevented from detaching from the retention unit in a purely radial direction and preferably in all radial directions. Advantageously, due to the projection, the retention unit and the indicator enter in at least one radial direction, preferably in a plurality of radial directions and particularly preferably in all radial directions. The at least one projection is advantageously arranged in a transition region between the retention unit base and one of the two retention legs. Preferably, both projections are arranged in each case in a transition region between the retention unit base and the retention leg in each case. It is particularly preferred that the projection or the projections of the retention unit is or are formed in the shape of a hook.

It is particularly preferred that the indicator comprises at least one lug or has at least two lugs which protrudes or protrude radially outward, so that the indicator is preferably prevented from being released from the retention unit in a purely radial direction. The indicator head particularly preferably protrudes in the radial direction over the indicator limbs, so that the at least one lug is formed or the at least two lugs are formed. The at least one lug or the at least two lugs is/are (in each case) arranged in a transition region between the indicator head and (in each case) one of the indicator limbs. It is particularly preferred that the at least one lug or the at least two lugs is or are (in each case) in engagement with the projection of the retention unit. It is particularly preferred that the lug or the lugs is/are formed in the shape of a hook.

According to a particularly preferred embodiment, the indicator limbs are arranged in the insertion direction of the counterpart behind the retention legs. Preferably, the retention legs are located between the front wall of the head portion and the indicator limbs. The indicator limbs expediently lie between the retention legs and the rear wall of the head portion. According to a particularly preferred embodiment, the extension of a gap between the retention legs and the indicator limbs in the axial direction is less than 2 mm, preferably less than 1 mm, more preferably less than 0.5 mm and particularly preferably less than 0.2 mm. According to a particularly preferred embodiment, the indicator limbs rest against the retention legs. The retention unit base advantageously projects beyond the retention legs and/or the indicator limbs and/or the indicator base in at least one and preferably in both axial directions.

It is within the scope of the disclosure that the indicator limbs can be or are spread apart—preferably only—radially when the circumferential collar is introduced. The indicator limbs preferably each include a contact area for contacting the circumferential collar. At least a partial region of the respective contact region of the indicator limbs is expediently chamfered radially inward for the purpose of introducing the male collar. It is particularly preferred that the contact regions of the indicator limbs each have at least one indicator limb projection which protrudes radially inward. The indicator limb projections are advantageously formed in such a way that they touch the circumferential collar when the counterpart is introduced, so that the indicator limbs are spread apart. It is particularly preferred that the indicator limb projections are formed in such a way that they pass the circumferential collar when the multifunctional part is moved from the preassembly position into the assembly position, so that the indicator limbs relax again.

It is particularly preferred that the coupling body has two indicator stops, each of the two indicator stops being assigned to one of the two indicator limbs. The indicator stops preferably define the preassembly position. The indicator stops or the indicator limbs are expediently formed such that when the multifunctional part is inserted into the coupling body, the indicator limb ends abut against the indicator stops. It is particularly advantageous that the indicator limbs or the indicator limb ends or the indicator stops are formed in such a way that when the counterpart is introduced, the circumferential collar touches the indicator limbs so that the indicator limbs are spread apart and the indicator limb ends can pass the indicator stops by means of manual pressure. The indicator stops or the multifunctional part are preferably formed in such a way that the retention unit or the retention legs do not abut against the indicator stops during the complete insertion path of the multifunctional part or during the complete insertion path of the counterpart.

It is within the scope of the disclosure that the multifunctional part has at least one retaining latch. It is preferred that the retaining latch is formed integrally with the retention unit and/or the indicator. The retaining latch preferably extends from the retention unit base or from the indicator head or from the back of the multifunctional part in the radial direction or in the direction of the counterpart or in the direction of the through-channel. The retaining latch is preferably located in the radial direction between the retention unit base or the indicator head or the back of the multifunctional part and an outer surface of the counterpart or the plug shaft. It is particularly preferred that the retaining latch is formed such that it overlaps in the radial direction in the assembly position with the circumferential collar of the counterpart. The retaining latch is expediently formed such that it does not overlap in the radial direction in the preassembly position with the circumferential collar of the counterpart. It is particularly preferred that the retaining latch is arranged axially between the front wall of the head portion and the indicator limbs in the assembly position. The rear of the retaining latch is expediently located in one plane together with the rear of the retention legs in order to secure the counterpart in the coupling body. It is advantageous that the retaining latch and the retention legs are formed such that the circumferential collar rests against the rear of the retaining latch and the rear of the retention legs when there is a tensile load between the counterpart and the quick connector. It is possible for the retaining latch to have at least one strut and preferably at least two struts extending from the retention unit base or from the indicator head or from the back of the multifunctional part. It is possible for the coupling body or the head portion to have grooves which are assigned to the retaining latch or the strut or struts.

It is particularly preferred that the head portion or the front wall or the rear wall of the coupling body have a slot so that the multifunctional part or the back of the multifunctional part or the retention unit or the retention unit base or the indicator or the indicator head can be inserted flush into the head portion. In the assembly position, an outer surface of the multifunctional part is preferably aligned with the head portion or with the front wall or with the rear wall in the circumferential direction or in the axial direction. An underside of the head portion preferably projects beyond the indicator limbs and/or the retention legs in the radial direction or the underside is in alignment with the indicator limbs and/or retention legs when the multifunctional part is in the assembly position.

It is within the scope of the disclosure that the retention legs each have a bulge extending in the axial direction, each bulge preferably being on a side of the retention legs facing away from the indicator or on a side of the retention legs facing the front wall of the coupling body. An inner surface of the front wall facing the retention legs preferably includes two indentations formed in the axial direction. The indentations are expediently formed so that they can accommodate the respective bulge. The indentations are advantageously openings in the front wall. The indentations are expediently located at such a radial height which corresponds to the radial height of the bulges of the retention legs in the preassembly position. It is particularly advantageous if the bulges and the indentations are formed in such a way that they interlock in particular when the quick connection comprising the quick connector and the counterpart is put under tension while the multifunctional part is in the preassembly position. The inside of the front wall preferably comprises two recesses which can accommodate the bulges of the retention legs in the assembly position. The recesses are used to ensure that, in the event of a tensile load on the quick connection, the front sides of the retention legs can rest flat against the inside of the front wall.

It is preferred that the coupling body has two retention stops, the retention stops being formed such that the retention legs are prevented from spreading open when the retention unit or the multifunctional part is in the assembly position. It is preferred that the ends of the retention legs are in the assembly position between the two retention stops. A retention stop is preferably assigned to each of the two retention legs, each retention stop preventing the movement of each retention leg radially outward.

According to one embodiment, the coupling body has a head part and a sealing part, the head part and the sealing part being formed separately from one another. It is particularly preferred that the head part and the sealing part can be latched or are latched together. The head portion of the coupling body is expediently part of the head part. The head part preferably comprises a latching portion. The latching portion of the head part preferably has at least two/three/four latching elements. The latching elements of the head part may be resiliently mounted latching lugs which point radially outward. It is preferred that the sealing part encloses a seal in the radial direction. The seal preferably comprises at least one elastically formed sealing ring and preferably two elastically formed sealing rings with a spacer in between. It is particularly preferred that the head part delimits the seal in the axial direction, so that the seal is held captive in the sealing part by the head part. The sealing part preferably comprises a latching portion for latching with the head part. It is appropriate that the plug-in portion is part of the sealing part. The sealing portion is expediently arranged between the plug-in portion and the latching portion of the sealing part. The latching portion of the sealing part preferably has latching elements which are formed to be complementary to the latching elements of the head part. The latching elements of the sealing part may be formed like a window, in which the resiliently mounted latching lugs of the head part can engage.

The object mentioned at the outset is or these objects mentioned at the outset are achieved by a quick connection comprising a quick connector according to the disclosure and a male counterpart with a circumferential collar. The counterpart expediently has a plug shaft, the plug shaft extending from the circumferential collar to the end of the counterpart. At the end of the counterpart, the counterpart preferably has a rounded outer surface that tapers towards an end face. With regard to the circumferential collar, a connection portion of the counterpart is preferably opposite the plug shaft. The connection portion may be formed, for example, for connection to a second tube and/or to an assembly (pump, tank, etc.). The connection may be formed for attaching or plugging in the second tube or unit. It is possible that the connection portion of the counterpart is connected in one piece or integrally with the unit.

The object mentioned at the outset is or the objects mentioned at the outset are achieved by a fluid line comprising a quick connector according to the disclosure or a quick connection according to the disclosure, the plug-in portion of the quick connector being connected to a first tube. The counterpart is preferably connected to a second tube or to a unit.

BRIEF DESCRIPTION OF THE DRAWINGS

The disclosure is explained in more detail below with reference to a drawing showing an embodiment. In a schematic representation:

FIG. 1 shows a quick connection according to the disclosure comprising a quick connector and a corresponding counterpart in a first perspective;

FIG. 2 shows the quick connector from FIG. 1 in a second perspective;

FIG. 3 shows the quick connector from FIG. 2 without the sealing part;

FIG. 4 shows the multifunctional part according to the disclosure from FIGS. 1 to 3;

FIG. 5 shows the quick connection from FIG. 1 in a longitudinal section;

FIGS. 6a-6b, 7a-7b, and 8a-8b show a sequence of movements of the multifunctional part from FIG. 4;

DETAILED DESCRIPTION

Figure 9:
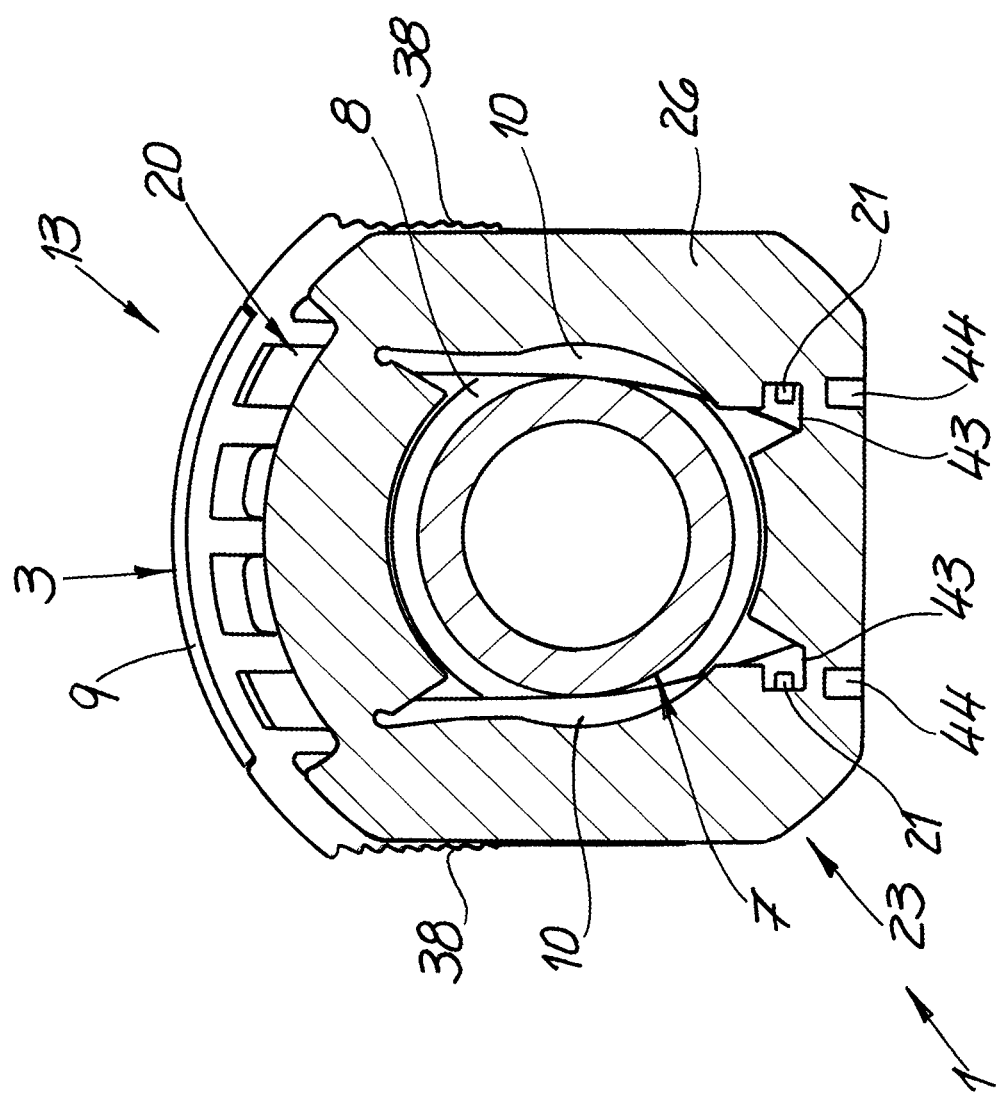
FIG. 9. is a cross section through the front wall of the quick connector according to the disclosure.

FIG. 1 shows a quick connection according to the disclosure comprising a quick connector 1 and a complementary male counterpart 7. The counterpart 7 is tubular and inserted into the quick connector 1. The quick connector 1 further comprises a multifunctional part 13 and a coupling body 2, the multifunctional part 13 being partially inserted into the coupling body 2 in the radial direction and coming from above in FIG. 1 and assuming a preassembly position there. In a rear region of the quick connector 1 or coupling body 2, a first tube 14 is pushed onto the quick connector 1 or coupling body 2. The counterpart 7 can for its part—depending on the design—be connected to a second tube (not shown in this case), by means of attaching or plugging in. The counterpart 7 can likewise be connected to a unit (for example a tank or a pump) or else be connected in one piece or integrally with the assembly. For the sake of simplicity, the generally known connection of the counterpart 7 to a second tube or to a unit is not shown either in FIG. 1 or in the subsequent drawings.

In FIG. 2, the quick connector is shown from a rear perspective, in which the first tube 14 has been omitted for the purpose of a better overview. From this perspective, it can be seen that the coupling body 2 is composed of a head part 23 receiving the multifunctional part 13 and a sealing part 24. The head part 23 and the sealing part 24 are connected to one another via a latching connection, latching elements 29 of the sealing part 24 in the form of windows being recognizable in FIG. 2. Due to the change in perspective, it can now also be seen that the multifunctional part 13 not only includes the retention unit 3, but also an indicator 4. In the preassembly position, the multifunctional part 13 is largely arranged between a front wall 26 and a rear wall 27 of the head part 23, which is only not the case for a back 25 of the multifunctional part 13. The back 25 has an axial extent which also covers the front wall 26 and the rear wall 27.

From FIGS. 1 and 2, it can be seen that both the front wall 26 and the rear wall 27 have a recess 20, this slot 20 being formed so as to be approximately complementary to the back 25. In this way, the multifunctional part 13 can be inserted further into the head part 23 from the preassembly position in FIGS. 1 and 2 by means of manual pressure from above until the multifunctional part 13 reaches the assembly position (not shown in FIG. 2). In the assembly position, the back 25 is sunk flush in the head part 23 both in the axial and in the radial direction. This flush countersinking of the back 25 in the head part 23 clearly indicates that the multifunctional part 13 has assumed the assembly position. Accordingly, the indicator function of the quick connector according to the disclosure is expressed in particular in the form of the flush countersinking of the multifunctional part 13 in the head part 23.

In FIG. 3, the sealing part 24 from FIG. 2 has been omitted, so that a seal 28 appears. The seal 28 comprises two elastically formed sealing rings and a spacer arranged in between. In addition, this drawing discloses latching elements 30 of the head part 23 in the form of resiliently mounted latching lugs which engage in the latching elements 29 of the sealing part 24. Between the latching elements 30 of the head part 23, rigid elements 31 are arranged in the circumferential direction and in an alternating sequence.

Finally, in FIG. 4, with a view to FIG. 3, the counterpart 7, the seal 28 and the head part 23 have been omitted, so that only the multifunctional part 13 can still be seen. Accordingly, the indicator 4 is substantially formed to be U-shaped and comprises an indicator head 11 and two indicator limbs 12 which extend from the indicator head 11 in the direction of insertion. Each of the two indicator limbs 12 has an indicator limb end 36 and an indicator limb projection 37. While one rear side of the indicator limbs 12 facing the rear wall 27 was formed to be even, this does not apply entirely to the front side of the indicator limbs 12. This is because, in particular in the region of the indicator limb projections 37, the front sides of the indicator limbs 12 are somewhat beveled towards the inside and in the insertion direction of the counterpart 7.

According to the embodiment according to FIG. 4, the retention unit 3 is approximately U-shaped and has a retention unit base 9 and two retention legs 10. Preferably, the retention unit base 9 is formed integrally with the retention legs 10. The two retention legs 10 expediently extend in the direction of insertion from the retention unit base 9. Like the indicator limbs 12, the retention legs 10 are elastically mounted and can be spread apart by the circumferential collar 8 of the counterpart 7. The front of the retention legs 10 is also beveled towards the inside and in the insertion direction of the counterpart 7 for the purpose of facilitating the introduction of the counterpart 7.

In addition, the multifunctional part 13 comprises, in particular according to FIG. 4, two securing arms 18, which encompass the retention legs 10 and the indicator limbs 12 in the radial direction. The securing arms 18 have an upper latching element 39 and a lower latching element 40 on the respective inside. In addition, both securing arms 18 have a grip element 38 on the outside in an upper region, which, for example, may have corrugation. The multifunctional part 13 finally has a retaining latch 19 which, in this embodiment, consists of three struts extending in the direction of insertion.

As shown in FIG. 4, the securing arms 18 and the retaining latch 19 are preferably formed integrally with the retention unit 3, 9, 10. In contrast, the indicator 4 in this embodiment is formed as a separate part and manufactured in a separate injection molding process. In this embodiment, the indicator 4 is fastened to the retention unit 3 in that the indicator 4 is clamped to the retention unit 3 and in this way forms the multifunctional part 13. For this purpose, the retention unit 3 has a projection 15 which projects radially inward. In a similar manner, the indicator 4 comprises a lug 16 which is directed radially outward and which engages with the projection 15 of the retention unit 3. As a result, the indicator 4 of this embodiment can no longer be released from the retention unit 3 in any radial direction. Detaching and reattaching the indicator 4 to the retention unit 3 is only possible by moving the indicator 4 in the axial direction. The projection 15 of the retention unit 3 and the lug 16 of the indicator 4 are formed in such a way that when inserting the indicator 4 onto the retention unit 3, there is also a force fit, whereby the indicator 4 is permanently and securely fastened to the retention unit 3.

In FIG. 5, a longitudinal section of the quick connection from FIGS. 1 and 2 is shown. Accordingly, the counterpart 7 has a circumferential collar 8 and a plug shaft 35. The quick connector 1 has a through-channel which extends in the axial direction along the head part 23 and the sealing part 24. The through-channel of the coupling body 2 is sealed against an outer surface of the counterpart 7 with the aid of the seal 28, so that a secure, fluid-tight connection is established between the first tube 14 and the second tube or the unit.

In FIG. 5, it is also shown that the head part 23 is divided into a head portion 5 and a latching portion 32. The head portion 5 is delimited in the axial direction by the front wall 26 and the rear wall 27 and receives the multifunctional part 13 or the retention legs 10, the indicator limbs 12, the securing arms 18 and the retaining latch 19. The latching portion 32 substantially comprises the latching elements 30 in the form of resiliently mounted latching lugs and the rigid elements 31. The sealing part 24 for its part comprises a latching portion 33, a sealing portion 34 and a plug-in portion 6. The latching portion 33 comprises, in particular, the latching elements 29 in the form of the windows, while the sealing portion 34 primarily surrounds the seal 28 radially. The plug-in portion 6 of this embodiment may have one or more plug-on mandrels and a flange as a tube stop 45 for the first tube 14. In this embodiment, the plug-in portion 6 also includes a groove for receiving a sealing ring (not shown here).

The sequence of movements of the retention unit 3 and the indicator 4 during the process of inserting the counterpart 7 is shown in FIGS. 6a to 8b. FIGS. 6a, 7a and 8a show in each case a cross section through the retention legs 10, while FIGS. 6b, 7b and 8b depict the corresponding cross section through the indicator limbs 12. In FIG. 6a, the multifunctional part 13 is in the preassembly position, the plug shaft 35 having already reached the retention legs 10. However, the plug shaft 35 has an outer diameter which does not cause the retention legs 10 to spread apart, so that the retention legs 10 in FIG. 6a are in a relaxed state. In this embodiment, the three struts of the retaining latch 19 are located in grooves assigned to them within the head portion 5 or the head part 23. Both the upper latching elements 39 and the lower latching elements 40 of the securing arms 18 are in engagement with an upper latching means 41 in the form of a window of a side wall of the head portion 5 or of the head part 23. The upper latching elements 39 define a little play with an upper edge of the upper latching means 41 in the form of the window. Above all, however, the upper latching elements 39 of the securing arms 18 secure the multifunctional part 13 in the coupling body 2 or in the head portion 6 or in the head part 23 by engagement with the upper latching means 41. The multifunctional part 13 can only be released from the coupling body 2 if both securing arms 18 are manually spread apart until the upper latching elements 39 are no longer in engagement with the upper latching means 41.

The cross section through the indicator limbs 12 in FIG. 6b shows a state in which the plug shaft 35 of the counterpart 7 has also already reached the indicator limbs 12. The indicator limbs 12 are also formed such that the outer diameter of the plug shaft 35 does not spread the indicator limbs 12 apart. Consequently, the indicator limbs 12 are also still in a relaxed state, so that in particular the indicator limb projections 37 either only rest lightly on the plug shaft 35 or are at a small distance therefrom. The indicator limb ends 36 abut against the indicator stops 17 in the radial direction downward, so that the multifunctional part 13 cannot be transferred into the assembly position by means of manual pressure from above. As a result, the multifunctional part 13 is in a blocked state in the preassembly position, which is very easily recognizable haptically by the user, for example a motor vehicle mechanic.

Looking at FIG. 7a, it can be seen that the counterpart 7 has now been inserted so far that its circumferential collar 8 spreads the retention legs 10 apart, for which the head portion 5 or securing arms 18 offers or offer sufficient space. In FIG. 7b, the counterpart 7 has been inserted a little further into the coupling body 2, so that the indicator limbs 12 are now also spread apart. While the indicator limbs 12 rest with their indicator limb projections 37 on the outer circumference of the circumferential collar 8, the retention legs 10 have returned to the relaxed position due to the further advance of the encircling collar 8 (not shown). Consequently, in the situation shown in FIG. 7b, the counterpart 7 is already in a latched or secured state with regard to the retention unit 3 or its retention legs 10. At the same time, the indicator limb ends 36 have been deflected to such an extent that they no longer abut against the indicator stops 17. Consequently, the user can now transfer the multifunctional part 13 into the assembly position by means of manual pressure from above on the back 25, as shown in FIGS. 8a and 8b.

As shown in FIG. 8a, the multifunctional part 13 is fully inserted, so that the lower ends of the retention legs 10 are aligned with a lower edge of the head portion 5. With the exception of a small radial play, the retention legs 10 can no longer be spread apart due to retention stops 22 of the head portion 5. Consequently, even a large tensile load on the quick connection comprising the quick connector 1 and the counterpart 7 cannot lead to the counterpart 7 being torn out of the quick connector 1. In this case, the retention legs 10 are also supported by the retaining latch 19, the struts of which additionally secure an upper region of the circumferential collar 8. In addition, the multifunctional part 13 is secured in the head portion 5 because the lower latching elements 40 of the securing arms 18 are in latched engagement with lower latching means 42 in the form of windows of the head portion 5. In this case, too, the multifunctional part 13 can only be released from the head portion 5 or from the coupling body 2 by manually spreading the securing arms 18 apart and at the same time pulling the multifunctional part 13 off upwards. The associated cross section through the indicator limbs 12 is then shown in FIG. 8b. Because the indicator limb projections 37 protruding far inward were pushed further down, they have now again assumed a relaxed position below the circumferential collar 8.

In the situation shown in FIGS. 8a and 8b, the counterpart 7 is fully inserted, while at the same time the multifunctional part 13 is fully inserted. The user recognizes the complete insertion by the fact that the back is now sunk flush in the head portion 5 with the aid of the slot 20. Because the assembly position or the flush countersinking can only be reached when the counterpart 7 is fully inserted (see FIG. 7b), the flush countersinking does not only show that the assembly position of the multifunctional part 13 was carried out but also, in particular, that the complete introduction of the counterpart 7 was carried out. The indicator 4 thus serves to check the complete introduction of the counterpart 7.

A cross section through the front wall 26 is shown in FIG. 9 and the situation described for FIG. 7b is also shown. Hence, in the case of FIG. 9, the circumferential collar 8 is already behind the retention legs 10 in the insertion direction and is thus secured by the retention unit 3, while the indicator limbs 12 are spread apart (hidden in this figure). The situation shown here thus shows the preassembly position of the quick connection immediately before the pressure is applied from above in order to transfer the quick connection into the assembly position. In this situation, the retention legs 10 can still be spread apart because they do not yet abut against the retention stops 22. The counterpart 7 can thus be torn out of the quick connector 1 again via a large tensile load on the quick connection.

Figure 10:
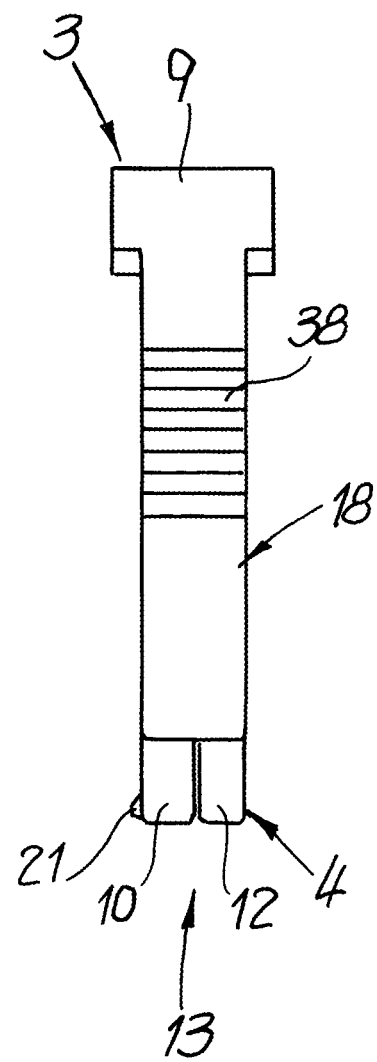
FIG. 10 is a side view of the multifunctional part.

In order to avoid this, bulges 21 are arranged at the ends of the retention legs 10 (see FIGS. 9 and 10), which extend in the axial direction and face the inside of the front wall 26. The front wall 26 also has two indentations 43, which in this embodiment are formed as wall openings and accommodate the bulges 21. The axial extent of the bulges 21 is relatively small, as can be seen in particular from FIG. 10. If a large tensile load now occurs on the quick connection, the retention legs 10 are pressed against the inside of the front wall 26, while at the same time the bulges 21 strive radially outward but are prevented from doing so by the radially outer side walls of the indentations 43. As a result, the bulges 21 and the indentations 43 are components of a tension protection for the preassembly position.

Furthermore, the front wall 26 according to FIG. 9 has two recesses 44 on the inside thereof, which, however, do not break through the wall, but have approximately the same axial extent as the bulges 21. If the quick connection is subjected to strong tension in the assembly position, the front sides of the retention legs 10 rest relatively flat against the inside of the front wall 26 because the recesses 44 fully accommodate the bulges 21.

| Reference signs | | | |
|---|---|---|---|
| 1 | Quick connector | 24 | Sealing part |
| 2 | Coupling body | 25 | Back |

| Reference signs | | | |
|---|---|---|---|
| 3 | Retention unit | 26 | Front wall |
| 4 | Indicator | 27 | Rear wall |
| 5 | Head portion | 28 | Sealing part |
| 6 | Plug-in portion | 29 | Latching element |
| 7 | Counterpart | 30 | Latching element |
| 8 | Circumferential collar | 31 | Rigid element |
| 9 | Retention legs | 32 | Latching portion |
| 10 | Retention legs | 33 | Latching portion |
| 11 | Indicator head | 34 | Sealing portion |
| 12 | Indicator limb | 35 | Plug shaft |
| 13 | Multifunctional part | 36 | Indicator limb end |
| 14 | First tube | 37 | Indicator limb projection |
| 15 | Projection | 38 | Grip element |
| 16 | Lug | 39 | Upper latching element |
| 17 | Indicator stops | 40 | Lower latching element |
| 18 | Securing arm | 41 | Upper latching means |
| 19 | Retaining latch | 42 | Lower latching means |
| 20 | Slot | 43 | Indentations |
| 21 | Bulge | 44 | Recesses |
| 22 | Retention stops | 45 | Tube stop |
| 23 | Head part | | |

The invention claimed is:

1. A quick connector comprising a coupling body and a multifunctional part, the multifunctional part having a retention unit and an indicator, the coupling body comprising a head portion at one end and a plug-in portion at the other end, the plug-in portion being formed for attaching or plugging in a first tube, the head portion having an axial opening for the introduction of a counterpart having a circumferential collar, the head portion comprising at least one radial opening for inserting the multifunctional part, the multifunctional part having a back for manual operation for the purpose of being inserted into the coupling body, the retention unit comprising two retention legs, the indicator having two indicator limbs, the indicator limbs being laterally movable independently of the retention legs when inserting the circumferential collar, the indicator limbs and the coupling body being formed so that the indicator can be transferred from a partially inserted preassembly position to a fully inserted assembly position due to the movement of the indicator limbs caused by the circumferential collar, wherein the coupling body has two indicator stops, each of the two indicator stops are assigned to one of the two indicator limbs such that the indicator stops define the preassembly position, wherein the retention unit and the indicator are at least two separate parts, the indicator being fastened directly to the retention unit so that the indicator and the retention unit are also fastened to one another outside of the coupling body.

2. The quick connector according to claim 1, wherein the multifunctional part has two securing arms for securing the multifunctional part in the coupling body.

3. The quick connector according to claim 1, wherein the retention unit has a retention unit base and/or the indicator comprises an indicator head.

4. The quick connector according to claim 1, wherein the indicator is fastened to the retention unit in a force fit and/or form fit and/or material connection.

5. The quick connector according to claim 1, wherein the retention unit and the indicator are latched to one another.

6. The quick connector according to claim 1, wherein the indicator is prevented from becoming detached from the retention unit in a purely radial direction or a purely axial direction.

7. The quick connector according to claim 1, wherein the indicator comprises at least one lug which protrudes radially outward.

8. The quick connector according to claim 1, wherein the indicator limbs are arranged behind the retention legs in the insertion direction of the counterpart.

9. The quick connector according to claim 1, wherein the multifunctional part has at least one retaining latch.

10. The quick connector according to claim 1, wherein the head portion of the coupling body has a slot configured such that the multifunctional part or the retention unit or the retention unit base can be pushed flush into the head portion.

11. The quick connector according to claim 1, wherein the retention legs each have a bulge extending in the axial direction, wherein the respective bulge is located on a side of the retention legs facing away from the indicator.

12. The quick connector according to claim 1, wherein the coupling body has two retention stops, and wherein the retention stops are formed so that spreading of the retention legs is prevented when the retention unit is in the assembly position.

13. The quick connector according to claim 1, wherein the coupling body comprises a head part and a sealing part, the head part and the sealing part being formed separately from one another.

14. The quick connector according to claim 1, wherein the indicator is clamped to the retention unit.

15. A quick connection, comprising the quick connector according to claim 1 and a counterpart having a circumferential collar.

16. The quick connector according to claim 1, wherein the indicator is manually operated from the partially inserted preassembly position to the fully inserted assembly position due to the movement of the indicator limbs caused by the circumferential collar.

17. The quick connector according to claim 1, wherein an indicator function of the quick connector is expressed in the form of the flush countersinking of the multifunctional part in the head portion of the coupling body.

18. A quick connector comprising a coupling body and a multifunctional part, the multifunctional part having a retention unit and an indicator, the coupling body comprising a head portion at one end and a plug-in portion at the other end, the plug-in portion being formed for attaching or plugging in a first tube, the head portion having an axial opening for the introduction of a counterpart having a circumferential collar, the head portion comprising at least one radial opening for inserting the multifunctional part, the multifunctional part having a back for manual operation for the purpose of being inserted into the coupling body, the multifunctional part having two securing arms for securing the multifunctional part in the coupling body, the retention unit comprising two retention legs, the indicator having two indicator limbs, the indicator limbs being laterally movable independently of the retention legs when inserting the circumferential collar, the indicator limbs and the coupling body being formed so that the indicator can be transferred from a partially inserted preassembly position to a fully inserted assembly position due to the movement of the indicator limbs caused by the circumferential collar, wherein the retention unit and the indicator are at least two separate parts, the indicator being fastened directly to the retention unit so that the indicator and the retention unit are also fastened to one another outside of the coupling body.

19. The quick connector according to claim 18, wherein the multifunctional part has at least one retaining latch.

20. The quick connector according to claim 18, wherein the coupling body has two retention stops, and wherein the retention stops are formed so that spreading of the retention legs is prevented when the retention unit is in the assembly position.

* * * * *